(12) United States Patent (10) Patent No.: US 9,084,521 B1
McCracken (45) Date of Patent: Jul. 21, 2015

(54) CONCEALED WINDOW CLEANING SYSTEM

(71) Applicant: Ivan McCracken, Longview, WA (US)

(72) Inventor: Ivan McCracken, Longview, WA (US)

( * ) Notice: Subject to any disclaimer, the term of this patent is extended or adjusted under 35 U.S.C. 154(b) by 0 days.

(21) Appl. No.: 14/188,851

(22) Filed: Feb. 25, 2014

(51) Int. Cl.
*A46B 3/18* (2006.01)
*A47L 1/06* (2006.01)
*B60S 3/04* (2006.01)

(52) U.S. Cl.
CPC ... *A47L 1/06* (2013.01); *A46B 3/18* (2013.01); *B60S 3/045* (2013.01)

(58) Field of Classification Search
CPC .................................... A46B 3/18; A46B 9/00
USPC ..................... 15/104.066, 160, 206
See application file for complete search history.

(56) References Cited

U.S. PATENT DOCUMENTS

| | | | | | |
|---|---|---|---|---|---|
| 60,013 | A | * | 11/1866 | King | 15/104.66 |
| 422,117 | A | * | 2/1890 | Christoffel | 15/104.16 |
| 1,120,812 | A | * | 12/1914 | Harbian | 15/26 |
| 1,173,721 | A | * | 2/1916 | Hurvitz | 401/278 |
| 3,760,449 | A | * | 9/1973 | Swanson | 15/206 |
| 4,819,291 | A | * | 4/1989 | Gunjian | 15/104.2 |
| 5,033,155 | A | * | 7/1991 | Klotz | 15/211 |
| 5,253,386 | A | * | 10/1993 | LaLonde | 15/206 |
| 5,297,310 | A | * | 3/1994 | Cox et al. | 15/106 |
| 5,319,821 | A | * | 6/1994 | Nicholson et al. | 15/104.8 |
| D356,443 | S | * | 3/1995 | Willis | D4/116 |
| 5,560,069 | A | * | 10/1996 | Berger et al. | 15/160 |
| 6,122,792 | A | * | 9/2000 | Roy | 15/104.2 |
| 6,460,215 | B1 | * | 10/2002 | Dues et al. | 15/160 |
| 6,779,221 | B2 | * | 8/2004 | Bockes | 15/160 |
| 6,823,552 | B1 | * | 11/2004 | Hillenbrand | 15/104.2 |
| 2005/0060824 | A1 | * | 3/2005 | Hillenbrand | 15/104.2 |

FOREIGN PATENT DOCUMENTS

WO WO9719615 6/1997

* cited by examiner

*Primary Examiner* — Randall Chin

(57) ABSTRACT

The surface cleaning assembly for scrubbing a surface in a concealed location includes a handle that may be gripped by a user. A shaft is coupled to the handle. The shaft may be positioned proximate the surface. A bristle is coupled to the shaft. The bristle may scrub the surface.

6 Claims, 3 Drawing Sheets

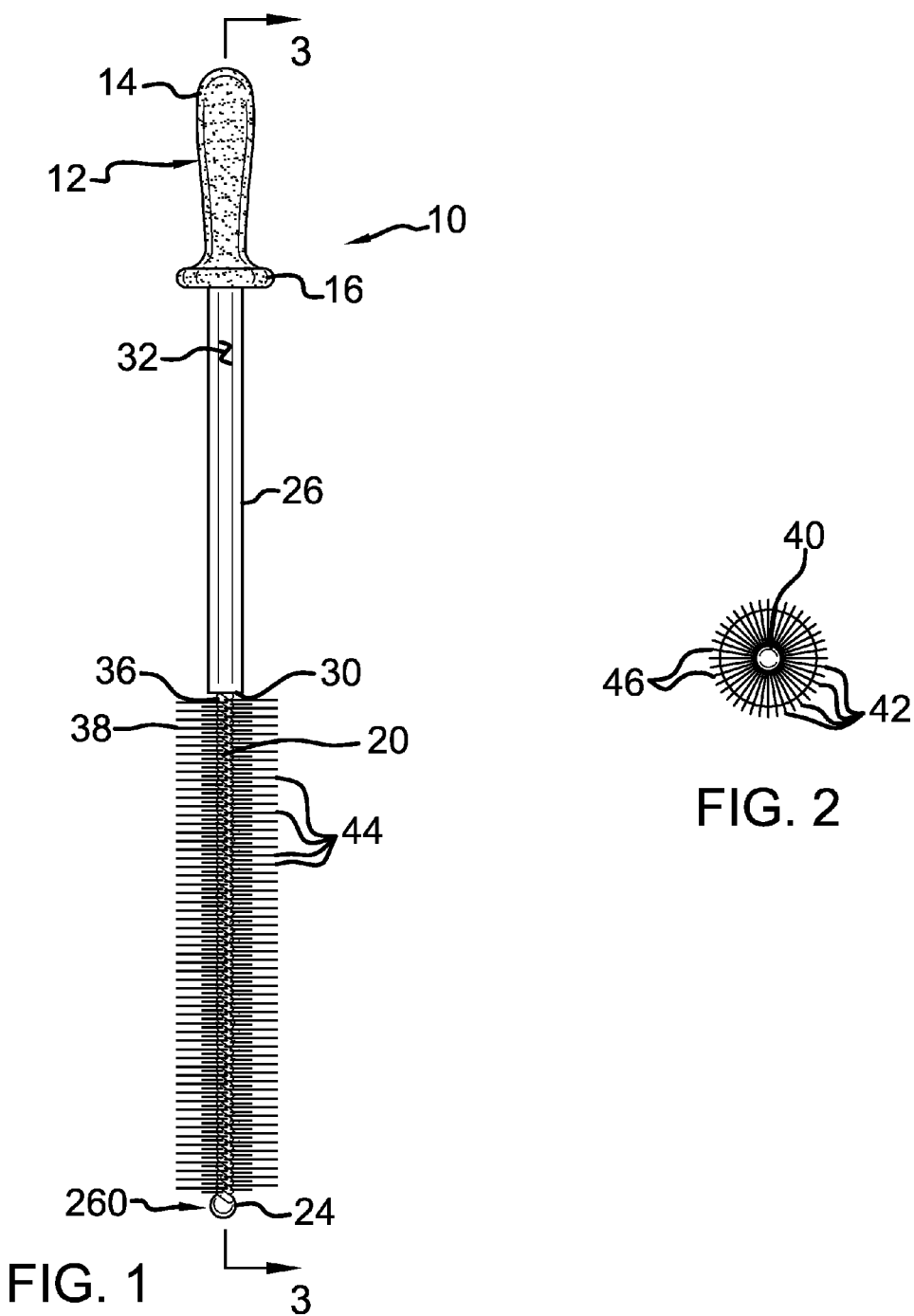

CONCEALED WINDOW CLEANING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of window cleaning systems, more specifically, concealed window cleaning system.

SUMMARY OF THE INVENTION

An embodiment of the disclosure meets the needs presented above by generally comprising a handle that may be gripped by a user. A shaft is coupled to the handle. The shaft may be positioned proximate the surface. A bristle is coupled to the shaft. The bristle may scrub the surface.

An object of the invention is to provide a device that is concealed window cleaning system.

These together with additional objects, features and advantages of the concealed window cleaning system will be readily apparent to those of ordinary skill in the art upon preferred, but nonetheless illustrative, embodiments of the concealed window cleaning system when taken in conjunction with the accompanying drawings.

In this respect, before explaining the current embodiments of the concealed window cleaning system in detail, it is to be understood that the concealed window cleaning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of concealed window cleaning system.

It is therefore important that the claims be regarded as including such equivalent construction insofar as they do not depart from the spirit and scope of concealed window cleaning system. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a front view of a surface cleaning assembly according to an embodiment of the disclosure.

FIG. 2 is a bottom view of an embodiment of the disclosure.

FIG. 4 is an in-use view of an embodiment of the

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 3:
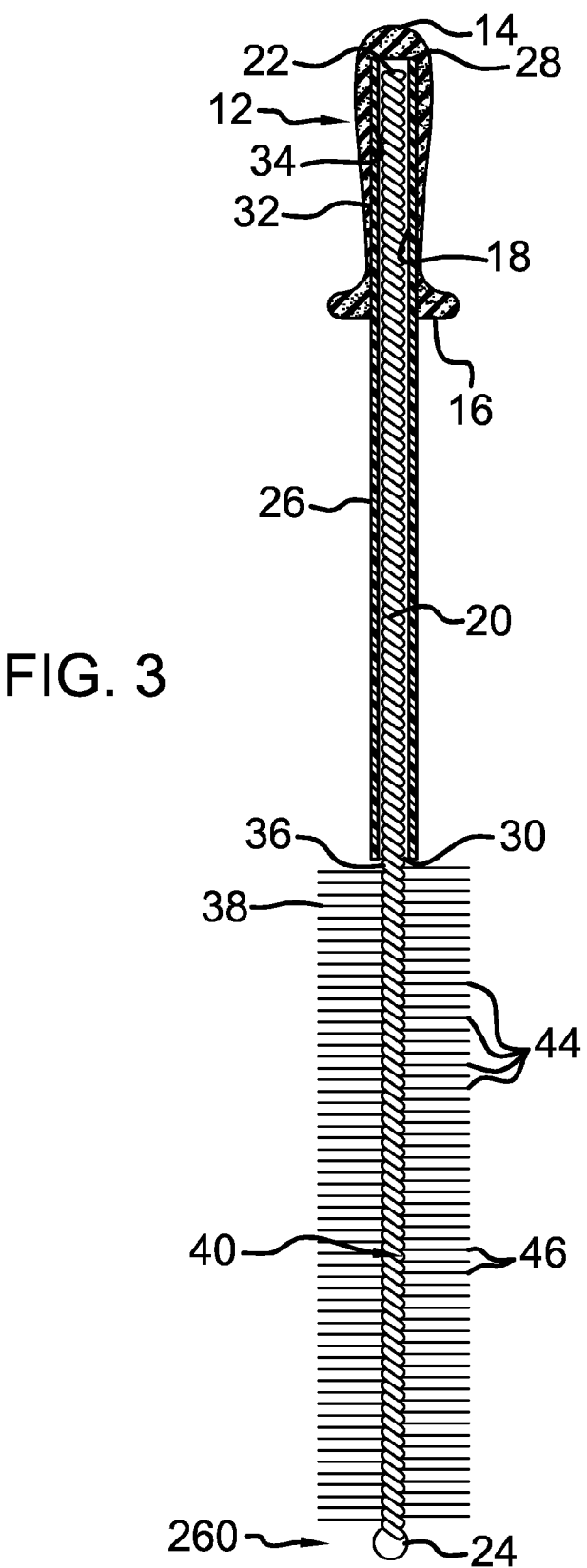
FIG. 3 is a cross sectional view taken along line 3-3 if FIG. 1 of an embodiment of the disclosure.
Figure 4:
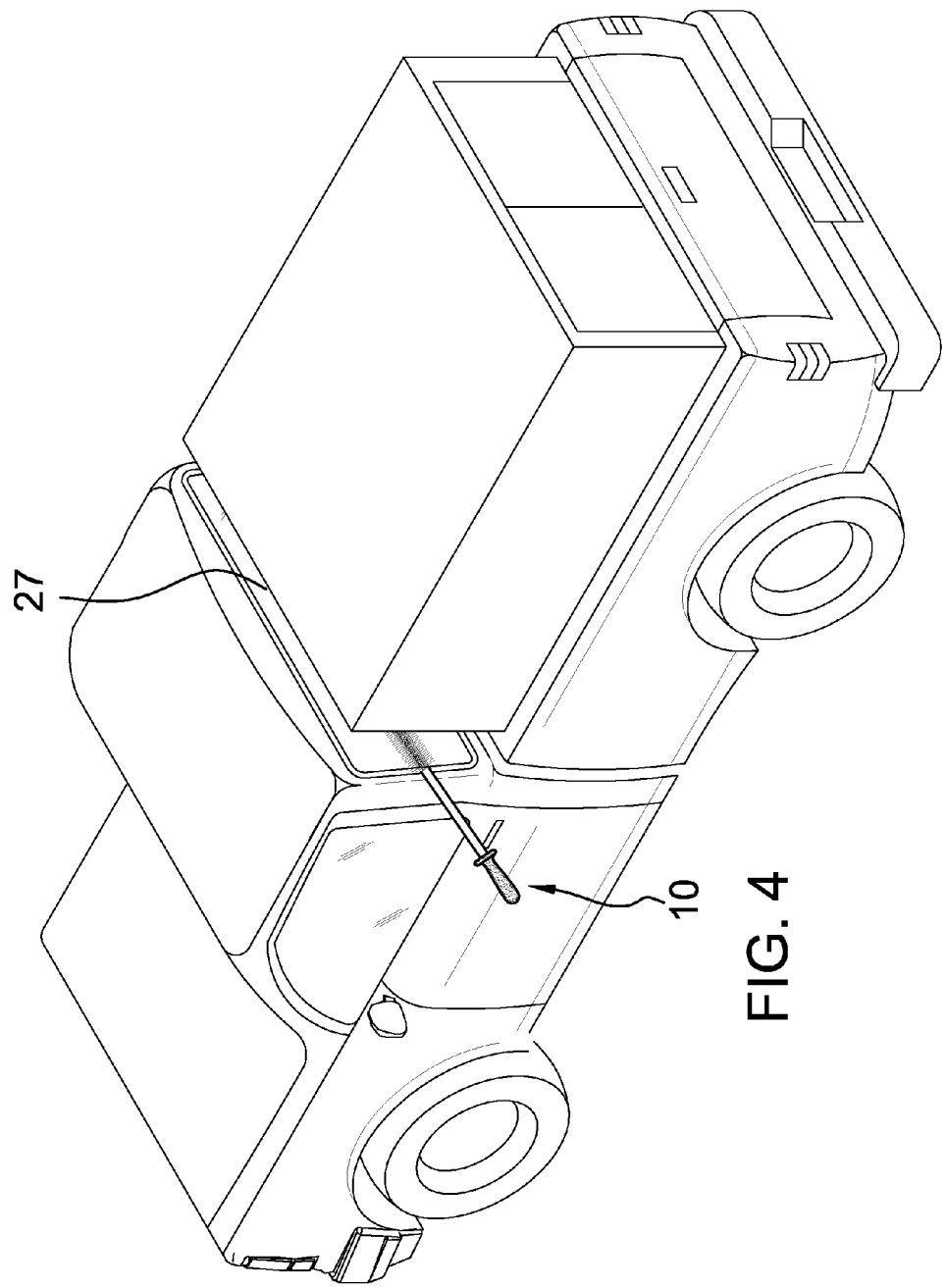

As best illustrated in FIGS. 1 through 4, the surface cleaning assembly 10 generally comprises a handle 12 elongated along a longitudinal axis extending through a top end 14 and a bottom end 16 of the handle 12. The handle 12 may have a length between 10 cm and 15 cm. Additionally, the bottom end 16 of the handle 12 has a width that is greater than the top end 14 of the handle 12. Moreover, the handle 12 has a bell shape.

The handle 12 may be gripped by a user. Continuing, the handle 12 may be comprised of a resiliently compressible material such as rubber or other similar material. A shaft well 18 extends upwardly into the bottom end 16 of the handle 12. The shaft well 18 may have a depth between 8 cm and 13 cm.

A shaft 20 is elongated along a longitudinal axis extending through a top end 22 and a bottom end 24 of the shaft 20. The shaft 20 may have a length between 100 cm and 125 cm. Further, the shaft 20 is twisted along the longitudinal axis so the shaft 20 forms a coil. The bottom end 24 of the shaft 20 forms a ball 260.

The shaft 20 extends upwardly into the shaft well 18. Additionally, the top end 22 of the shaft 20 is positioned in the shaft well 18. The shaft 20 may be positioned proximate a surface 27 to be cleaned. Lastly, the surface 27 may be a window on a vehicle of any conventional design.

A sleeve 26 is elongated along a longitudinal axis extending through a top end 28 and a bottom end 30 of the sleeve 26. The sleeve 26 may have a length between 75 cm and 100 cm. Moreover, the sleeve 26 insertably receives the shaft 20. The sleeve 26 prevents the shaft 20 from contacting the surface 27.

The top end 28 of the sleeve 26 extends upwardly into the shaft well 18. An outer surface 32 of the sleeve 26 abuts an inside surface 34 of the shaft well 18. The sleeve 26 extends downwardly along the shaft 20 so the bottom end 30 of the sleeve 26 is positioned proximate a middle 36 of the shaft 20. Lastly, the sleeve 26 may be comprised of a rigid and non-abrasive material such as plastic or other similar material.

A bristle 38 is coupled to an outer surface 40 of the shaft 20. The bristle 38 extends laterally away from the shaft 20. Further, the bristle 38 may have a length between 5 cm and 7 cm. The bristle 38 may be comprised of a resiliently bendable material.

The bristle 38 is one of a plurality of the bristles 42. Moreover, the plurality of bristles 42 is evenly distributed around an entire circumference of the shaft 20. The plurality of bristles 42 radiates outwardly from the shaft 20. Lastly, the plurality of bristles 42 comprises a plurality of sets of the bristles 44.

The plurality of sets of the bristles 44 is evenly distributed between the bottom end 30 of the sleeve 26 and the bottom end 24 of the shaft 20. Further, the plurality of sets of bristles 44 may cover a distance on the shaft 20 between 25 cm and 35 cm. Finally, each of the plurality of sets of the bristles 44 may scrub the surface 27.

In use, the shaft 20 is positioned proximate the surface 27 so a free end 46 of each of the plurality of bristles 42 engages the surface 27. The window on the vehicle may be a window between a cab and a canopy of a pickup truck of any conventional design. Further, the shaft 20 is positioned between the cab and the canopy of the pickup truck in order to clean the window. The plurality of sets of bristles 44 are moved across the surface 27 until the surface 27 is clean.

With respect to the above description, it is to be realized that the optimum dimensional relationship for the various components of the surface cleaning assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the surface cleaning assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A surface cleaning assembly for scrubbing a surface in a concealed location, said assembly comprising:
   a handle configured to be gripped by a user;
   a shaft coupled to said handle wherein said shaft is configured to be positioned proximate the surface; and
   a bristle coupled to said shaft wherein said bristle is configured to scrub the surface;
   wherein said handle being elongated along a longitudinal axis extending through a top end and a bottom end of said handle;
   wherein a bottom end of said handle having a width being greater than a top end of said handle wherein said handle has a bell shape;
   wherein a shaft well extending upwardly into a bottom end of said handle;
   wherein said shaft being elongated along a longitudinal axis extending through a top end and a bottom end of said shaft;
   wherein said shaft extending upwardly into said shaft well wherein said top end of said shaft is positioned in said shaft well;
   wherein a sleeve being elongated along a longitudinal axis extending through a top end and a bottom end of said sleeve;
   wherein said sleeve insertably receiving said shaft wherein a top end of said sleeve extends upwardly into said shaft well;
   wherein an outer surface of said sleeve abuts an inside surface of said shaft well;
   wherein said sleeve extending downwardly along said shaft wherein a bottom end of said sleeve is positioned proximate a middle of said shaft;
   wherein said bristle being coupled to an outer surface of said shaft wherein said bristle extends laterally away from said shaft.

2. The assembly according to claim 1 wherein said bristle being one of a plurality of said bristles.

3. The assembly according to claim 2 wherein said plurality of bristles being evenly distributed around an entire circumference of said shaft.

4. The assembly according to claim 2 wherein said plurality of bristles comprising a plurality of sets of said bristles.

5. The assembly according to claim 4 wherein said plurality of sets of said bristles being evenly distributed between a bottom end of said sleeve and a bottom end of said shaft.

6. A surface cleaning assembly for scrubbing a surface in a concealed location, said assembly comprising:
   a handle configured to be gripped by a user;
   a shaft coupled to said handle wherein said shaft is configured to be positioned proximate the surface; and
   a bristle coupled to said shaft wherein said bristle is configured to scrub the surface;
   wherein said handle being elongated along a longitudinal axis extending through a top end and a bottom end of said handle; said bottom end of said handle having a width being greater than said top end of said handle wherein said handle has a bell shape; a shaft well extending upwardly into said bottom end of said handle;
   wherein said shaft being elongated along a longitudinal axis extending through a top end and a bottom end of said shaft; said shaft extending upwardly into said shaft well wherein said top end of said shaft is positioned in said shaft well;
   wherein a sleeve being elongated along a longitudinal axis extending through a top end and a bottom end of said sleeve; said sleeve insertably receiving said shaft wherein said top end of said sleeve extends upwardly into a shaft well wherein an outer surface of said sleeve abuts an inside surface of said shaft well; said sleeve extending downwardly along said shaft wherein said bottom end of said sleeve is positioned proximate a middle of said shaft;
   wherein said bristle being coupled to an outer surface of said shaft wherein said bristle extends laterally away from said shaft; said bristle being one of a plurality of said bristles; said plurality of bristles being evenly distributed around an entire circumference of said shaft; said plurality of bristles comprising a plurality of sets of said bristles; said plurality of sets of said bristles being evenly distributed between a bottom end of said sleeve and a bottom end of said shaft.

* * * * *